(12) United States Patent
Capps, Jr. et al.

(10) Patent No.: US 7,721,119 B2
(45) Date of Patent: May 18, 2010

(54) SYSTEM AND METHOD TO OPTIMIZE MULTI-CORE MICROPROCESSOR PERFORMANCE USING VOLTAGE OFFSETS

(75) Inventors: Louis Bennie Capps, Jr., Georgetown, TX (US); Warren D. Dyckman, Peekskill, NY (US); Joanne Ferris, Essex, VT (US); Anand Haridass, Austin, TX (US); James Douglas Jordan, Round Rock, TX (US); Ronald Edward Newhart, Essex Junction, VT (US); Michael Richard Ouellette, Westford, VT (US); Michael Jay Shapiro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 11/466,891

(22) Filed: Aug. 24, 2006

(65) Prior Publication Data
US 2008/0052542 A1 Feb. 28, 2008

(51) Int. Cl.
*G06F 1/00* (2006.01)
(52) U.S. Cl. ............ 713/300; 363/21.01; 327/321; 323/364; 323/367
(58) Field of Classification Search .......... 713/300; 363/21.01; 327/321, 540; 323/265, 311, 323/364, 367
See application file for complete search history.

(56) References Cited

U.S. PATENT DOCUMENTS

| | | | | |
|---|---|---|---|---|
| 5,459,684 | A | | 10/1995 | Nakamura et al. .......... 365/149 |
| 5,659,789 | A | * | 8/1997 | Hausauer et al. ........... 713/322 |
| 6,229,378 | B1 | * | 5/2001 | Gourley et al. ............. 327/525 |
| 6,359,428 | B1 | | 3/2002 | Kawamura ................. 323/369 |
| 6,396,169 | B1 | * | 5/2002 | Voegeli et al. ............... 307/52 |
| 6,574,577 | B2 | * | 6/2003 | Stapleton et al. ........... 702/117 |
| 6,711,447 | B1 | * | 3/2004 | Saeed ......................... 700/82 |
| 6,745,275 | B2 | * | 6/2004 | Chang ........................ 710/305 |
| 6,772,356 | B1 | * | 8/2004 | Qureshi et al. ............. 713/321 |
| 6,948,079 | B2 | * | 9/2005 | Zhang et al. ............... 713/300 |
| 7,389,195 | B2 | * | 6/2008 | Capps et al. ................ 702/118 |
| 7,401,241 | B2 | * | 7/2008 | Rotem et al. ............... 713/320 |
| 7,516,358 | B2 | * | 4/2009 | Haefliger et al. ............. 714/10 |
| 7,526,660 | B2 | * | 4/2009 | Thaker et al. .............. 713/300 |
| 2002/0104031 | A1 | * | 8/2002 | Tomlinson et al. ......... 713/320 |

(Continued)

FOREIGN PATENT DOCUMENTS

EP 0 978 781 2/2000

(Continued)

*Primary Examiner*—Mark Connolly
(74) *Attorney, Agent, or Firm*—VanLeeuwen & VanLeeuwen; Matthew B. Talpis

(57) ABSTRACT

A system and method to optimize multi-core microprocessor performance using voltage offsets is presented. A multi-core device tests each of its processor cores in order to identify each processor core's optimum supply voltage. In turn, the device configures voltage offset networks for each processor core based upon each processor core's identified optimum supply voltage. As a result, the offset voltages produced by the voltage offset networks are subtracted from the multi-core device's main voltage, which results in the voltage offset networks supplying optimum supply voltages to each processor core. The voltage offset networks may include fuses to generate a fixed voltage offset, or the voltage offset networks may include a control circuit to dynamically adjust voltage offsets during the multi-core device's operation.

30 Claims, 11 Drawing Sheets

U.S. PATENT DOCUMENTS

| | | | |
|---|---|---|---|
| 2002/0162033 A1* | 10/2002 | Maxwell et al. | 713/300 |
| 2003/0120958 A1* | 6/2003 | Zhang et al. | 713/300 |
| 2003/0154456 A1* | 8/2003 | Koike et al. | 716/8 |
| 2004/0207374 A1* | 10/2004 | Schaffer | 323/282 |
| 2005/0154931 A1* | 7/2005 | Oh | 713/300 |
| 2006/0069935 A1* | 3/2006 | Thaker et al. | 713/300 |
| 2006/0190746 A1* | 8/2006 | Boerstler et al. | 713/300 |
| 2008/0012583 A1* | 1/2008 | Audet et al. | 324/713 |
| 2008/0048737 A1* | 2/2008 | Ito et al. | 327/109 |
| 2008/0309314 A1* | 12/2008 | Chang | 323/354 |

FOREIGN PATENT DOCUMENTS

| | | |
|---|---|---|
| EP | 1 555 595 | 7/2005 |
| EP | 1 607 835 | 12/2005 |
| JP | 07141041 A * | 6/1995 |
| WO | WO 03/014902 | 2/2003 |

* cited by examiner

US 7,721,119 B2

SYSTEM AND METHOD TO OPTIMIZE MULTI-CORE MICROPROCESSOR PERFORMANCE USING VOLTAGE OFFSETS

BACKGROUND OF THE INVENTION

1. Technical Field

The present invention relates to a system and method to optimize multi-core microprocessor performance using voltage offsets. More particularly, the present invention relates to a system and method to internally generate processor core optimum supply voltages within a device by using voltage offset networks to produce specific offset values for each processor core.

2. Description of the Related Art

Processing devices today include multiple "cores" in order to achieve a higher performance level. These cores may work together, or individually, to execute particular functions within an application. For example, a multi-core processing device may include multiple digital signal processor cores in order to effectively execute highly computational tasks, such as with a gaming application.

One aspect of a processor core's performance is based upon its supply voltage. A processor core's "optimum" supply voltage is a voltage that allows a processor to run at a specified performance at the lowest possible power. With a multi-core device, each processor core requires its own optimum supply voltage in order for the multi-core device to perform at its optimum performance level. A challenge found is that each processor core may require a specific supply voltage due to different core types and process variations. For example, a multi-core device may include core A, core B, core C, and core D, in which their optimum supply voltages are 1.73V, 1.84V, 1.54V, and 1.95V, respectively.

One approach for providing optimum supply voltages to individual processor cores is by including separate voltage planes within the multi-core device for each supply voltage. For example, if a device includes four processor cores, the device also includes four separate voltage planes. A challenge found with this approach, however, is that each voltage plane is connected to different pins on the device for receiving different external supply voltages, thus reducing the amount of pins that the device has available for other functions. Using the example described above, the multi-core device is required to dedicate at least four separate pins to the four different supply voltages.

In addition, since the device receives a specific supply voltage for each processor core, the package and the circuit board in which the multi-core device resides must also provide each of the specific supply voltages. Existing art provides the specific supply voltages by using one voltage regulator module per required supply voltage. Using the example described above, the circuit board in which the four core device resides would include four voltage regulator modules to provide the four specific supply voltages. The package also contains four separate voltage planes to supply the chip. A challenge found with this approach is that using multiple voltage regulator modules increases production cost as well as board layout complexity. In addition, the extra power planes in the package also increase package cost and complexity.

Another approach that existing art uses with multi-core devices is to simply supply a single supply voltage to each processor core. While this approach may minimize cost and simplify board layout, the result is a device that does not operate at its optimum performance level.

What is needed, therefore, is a system and method to provide individual supply voltages to each processor core within a multi-core device while, at the same time, minimizing circuit board layout complexities and production cost.

SUMMARY

It has been discovered that the aforementioned challenges are resolved using a system and method to internally generate processor core optimum supply voltages within a device by producing offset values for each processor core using voltage offset networks. A multi-core device includes one voltage offset network for each of its processor cores. Each voltage offset network receives the same external supply voltage, and creates an "optimum offset value" (voltage offset) that provides its corresponding processor core with the processor core's optimum supply voltage. A voltage offset network may create a static offset value or the voltage offset network may dynamically adjust its offset value during device operation based upon device parameters.

A system tests each processor core and identifies each of the processor core's optimum supply voltage. In turn, the system calculates an optimum offset value for each processor core by subtracting the processor core's optimum supply voltage from the device's main voltage value.

In one embodiment, a device blows specific fuses within each voltage offset network to produce the optimum offset values. In this embodiment, the voltage offset network may include various resistors and/or transistors to produce particular voltage offsets and/or to support large current requirements.

In another embodiment, a device configures a control circuit to dynamically generate a voltage offset value based upon particular device parameters, such as the device's temperature or performance requirements. In this embodiment, the voltage offset network may also include various resistors and/or transistors to produce particular voltage offsets and/or to support large current requirements. Since specific processor core voltages are generated within the multi-core device, the device requires a single supply voltage that, as a result, reduces package and circuit board cost and complexity.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
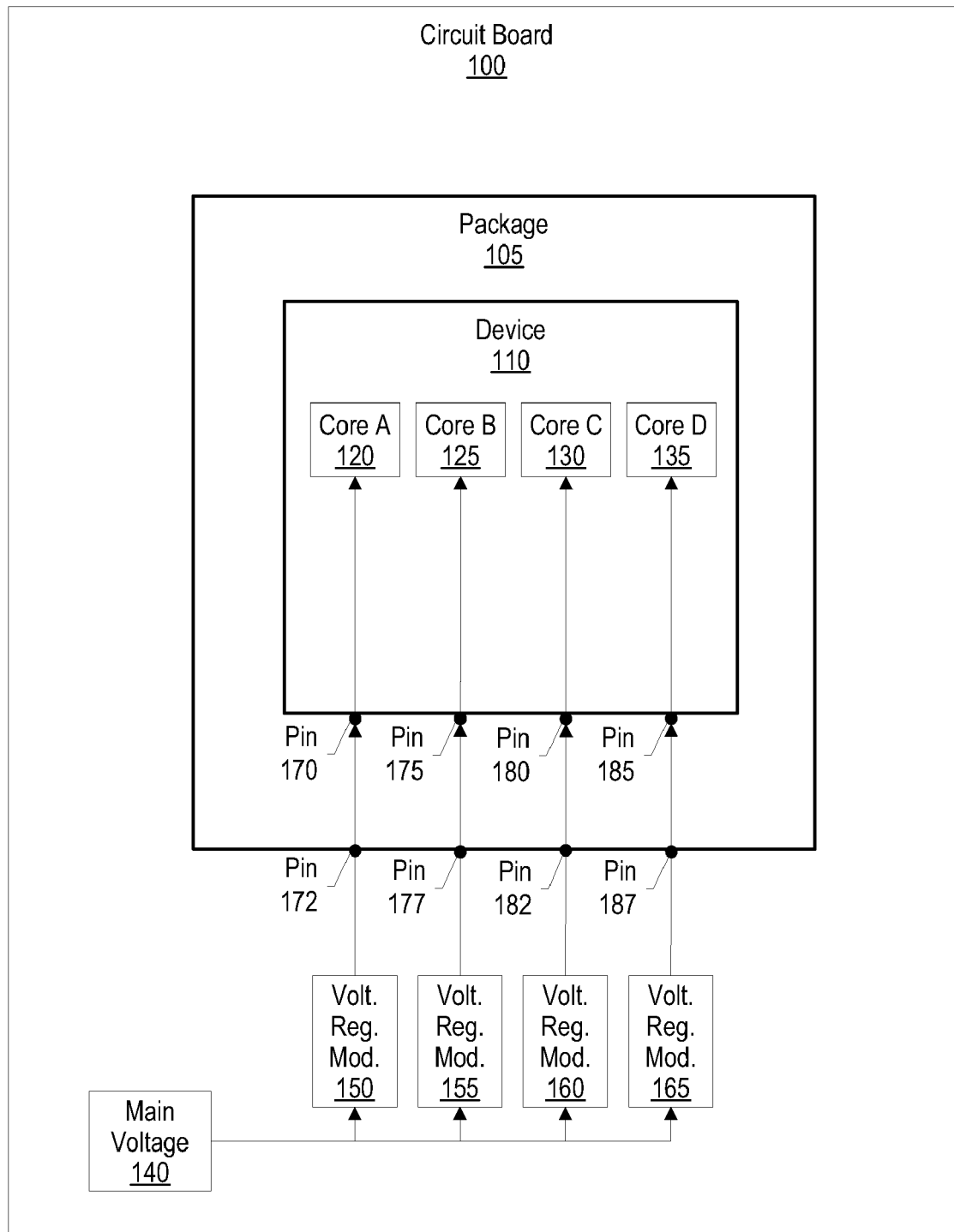
FIG. 1 is a diagram showing a prior art implementation of providing specific supply voltages to a multi-core device's processor cores.

FIG. 1 is a diagram showing a prior art implementation of providing specific supply voltages to each processor core within a multi-core device. Circuit board 100 includes package 105 (e.g., ball grid array package). Package 105 includes multi-core device 110, which comprises core A 120, core B 125, core C 130, and core D 135. In order to perform at an optimum level, each of these cores requires a specific supply voltage due to process variations and different core types. For example, core A 120, core B 125, core C 130, and core D 135, may require supply voltages of 1.73V, 1.84V, 1.54V, and 1.95V, respectively, to achieve optimum performance.

In order to provide specific supply voltages to each core, circuit board 100 uses voltage regulator modules 150-165, which increases production cost. As can be seen, voltage regulator modules 150-165 receive power from device voltage 140, and provide specific supply voltages to package 105 through package pins 172, 177, 182, and 187. As such, package 105 includes at least four different connections from its pins to device 110's pins 170, 175, 180, and 185 in order to provide the different supply voltages to the different cores. In one embodiment, each of pins 170, 172, 175, 177, 180, 182, 185, and 187 represents a group of pins, such as thirty pins each.

As can be seen from the example shown in FIG. 1, circuit board 100 requires four separate connections between voltage regulator modules 150-165 and package 105's pins, as well as package 105 requiring four separate connections between its pins and device 110's pins. Thus, both circuit board 100's and package 105's cost and complexity increase for every core that device 110 includes.

As one skilled in the art can appreciate, the invention described herein may be applied to any device circuitry module. A circuitry module includes circuitry designed for a particular purpose, such as a processor core, memory, input/output, DMA controller, etc. For example, a device may include three voltage offset networks, wherein a first voltage offset network supplies a circuitry voltage to a processor core circuitry module, a second voltage offset network supplies a different circuitry voltage to a memory circuitry module, and a third voltage offset network supplies yet a different circuitry voltage to an input/output circuitry module.

Figure 2:
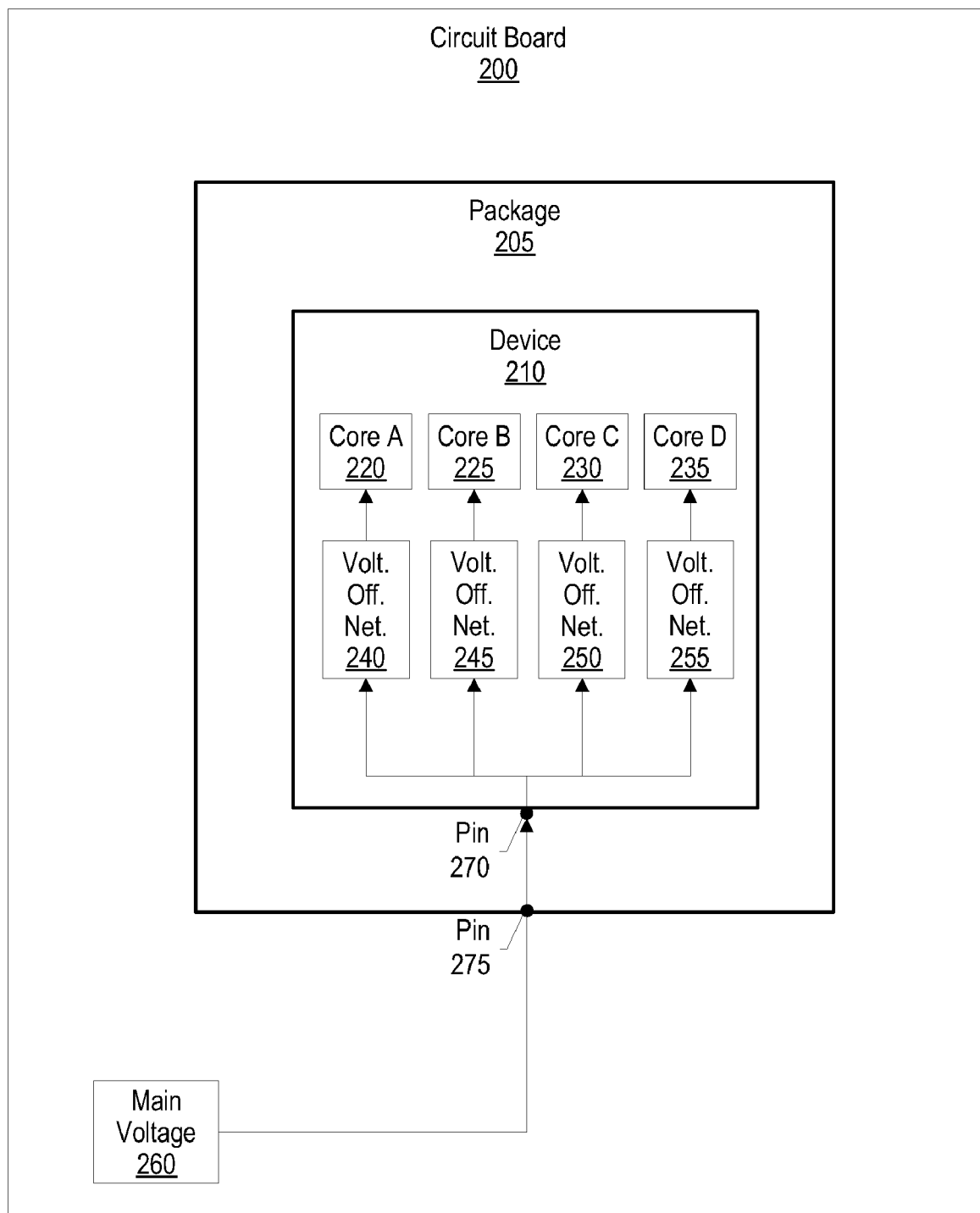
FIG. 2 is a diagram showing a device generating multiple processor core supply voltages from a single supply voltage.

FIG. 2 is a diagram showing a device generating multiple processor core supply voltages from a single supply voltage. Circuit board 200 includes package 205 (e.g., ball grid array package). Package 205 includes multi-core device 210, which comprises core A 220, core B 225, core C 230, and core D 235. Each of the processor cores may be the same type of processor core, or the processor cores may be different (heterogeneous) processor core types.

Circuit board 200 includes main voltage 260, which provides a supply voltage to package 205 at package pin 275. In turn, package 205 includes a connection from package pin 275 to device pin 270. The device's supply voltage is then routed to each of voltage offset networks 240-255, which are included in device 210. Voltage offset networks 240-255 each correspond to a particular processor core, and are responsible for creating a particular optimum offset value. As a result, the output of voltage offset networks 240-255 result in optimum processor supply voltages for their respective processor cores. For example, if main voltage 260 supplies a 2.0 volt device supply voltage, and voltage offset network 240 produces an optimum offset value of 0.25 volts, the processor core supply voltage provided to core A 220 is 1.75 volts. In one embodiment, each of pins 270 and 275 represents a group of pins, such as thirty pins each.

Many viable embodiments exist for voltage offset networks 240-255. These embodiments may be static, such as through blowing fuses, or dynamic, such as by using control circuits to dynamically control the processor core optimum supply voltage during device operation (see FIGS. 3-10, and corresponding text for further details).

In these embodiments, reliability issues do not arise, even with transistor variability. For example, assume that each core consumes 20 watts of power. A typical nFET (negative Field Effect Transistor) handles 1 mA of current and its resistance is 1 Kohm. Current per C4 (solder ball connection between package and device) is 200 mA and includes 100 Vdd C4s/core. The required amount of transistors depends upon the desired resistance drop and, using the information above, two cases may be derived:

|  | Case 1 | Case 2 |
|---|---|---|
| Voltage Drop Increments | 0.05 V | 0.2 V |
| Transistors/Solder Ball | 4000 | 1000 |
| Transistors/Core | 400K | 100K |
| Current/Transistor | 0.05 mA | 0.2 mA |
| Power/Transistor | 2.5 uW | 40 uW |
| Power/Core | 1 W | 4 W |

Regarding reliability concerns, NBTI (Negative bias temperature instability) and hot carrier injection are not an issue at less than one volt. The above cases show 0.05 volts and 0.2 volts, which are acceptable values. In addition, electro migration is not a concern when current density is less than 12 mA/um2, which is resolved by limiting wires to three times the minimum design rule area.

Figure 3:
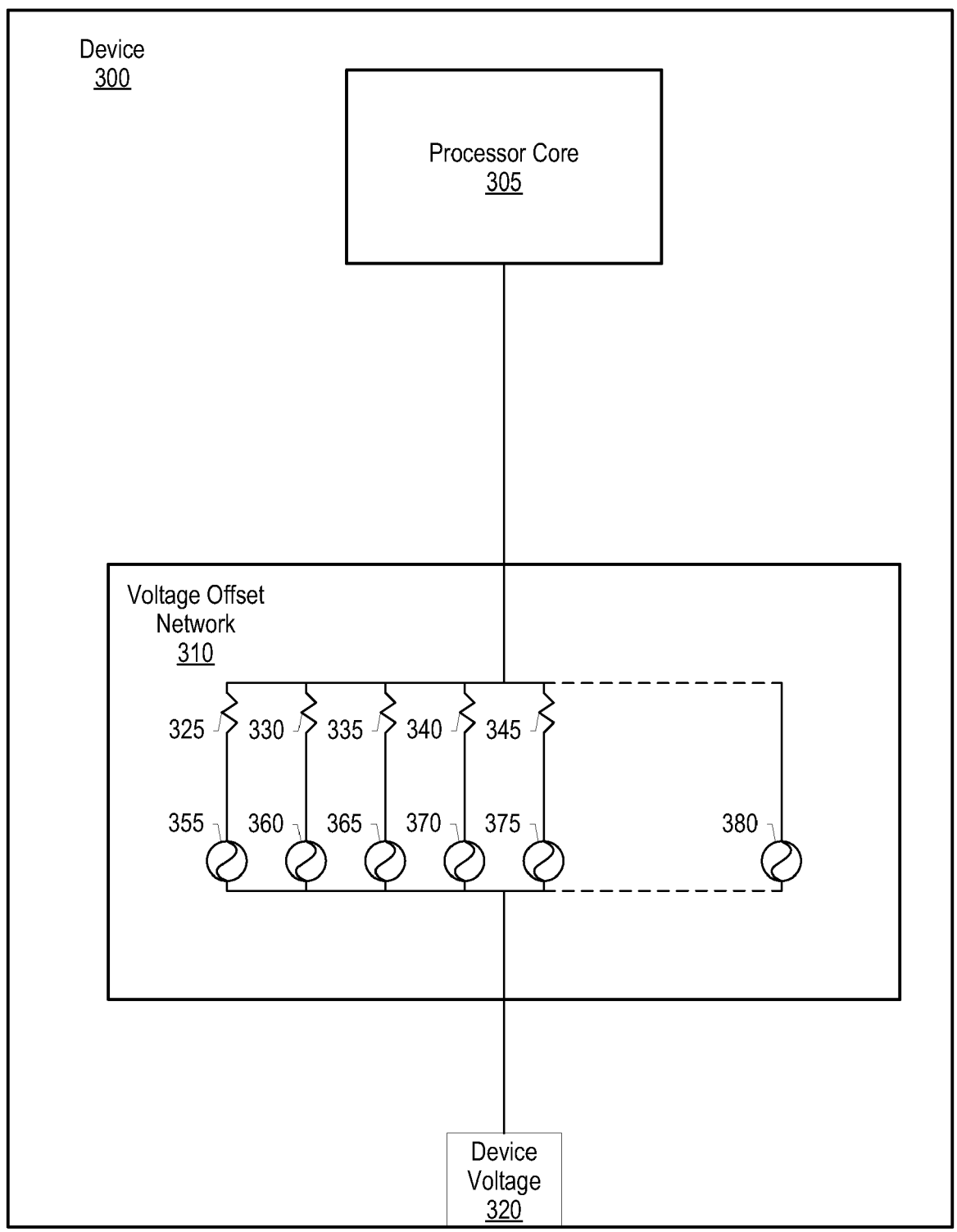
FIG. 3 is a diagram showing an embodiment of a voltage offset network that includes multiple resistors and multiple fuses.

FIG. 3 is a diagram showing an embodiment of a voltage offset network that includes multiple resistors and multiple fuses. Device 300 includes multiple cores, one of which being processor core 305. Device voltage 320 provides a supply voltage to voltage offset network 310. In turn, voltage offset network 310 is configured to create an optimum offset value that results in an processor core optimum supply voltage, which is provided to processor core 305.

Voltage offset network 310 includes resistors 325-345 and fuses 355-380. Resistors 325-345 may be the same value, or may different values depending upon a device designer's required offset increment levels. Fuses 355-380 are blown, such as during device test, in order for voltage offset network 310 to produce the optimum offset value. If processor core 305 requires the maximum supply voltage available (device voltage 320), fuses 355-375 are blown, and fuse 380 is kept in tact in order for device voltage 320 to pass through voltage offset network 310 without encountering a resistor to produce a voltage drop. When processor core 305 requires less voltage than device voltage 320 supplies, fuse 380 is blown and fuses 355-375 are blown appropriately in order to produce the optimum offset value.

Figure 4:
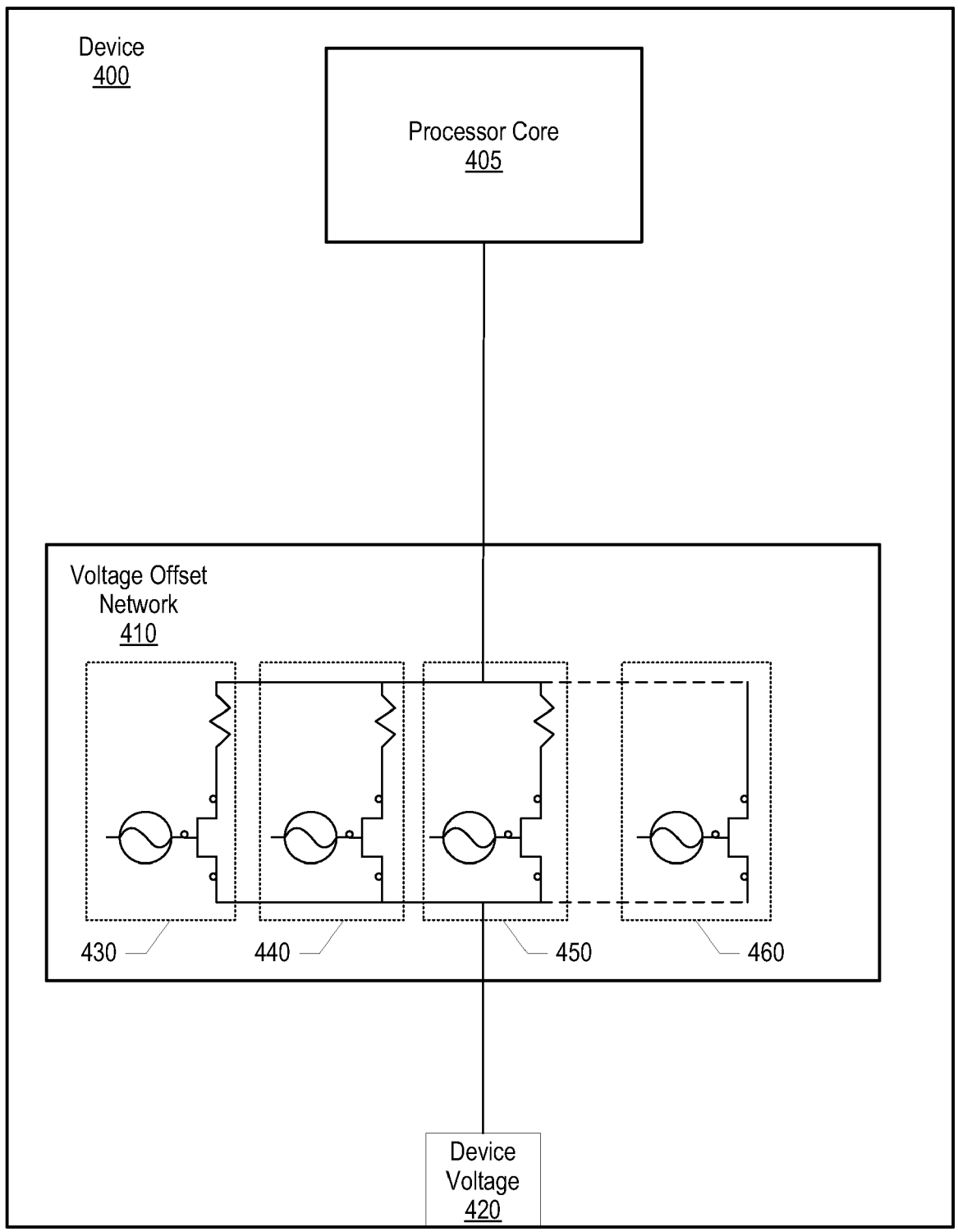
FIG. 4 is a diagram showing an embodiment of a voltage offset network that includes multiple offset components, most of which comprise a resistor, transistor, and fuse.

FIG. 4 is a diagram showing an embodiment of a voltage offset network that includes multiple offset components, most of which comprise a resistor, transistor, and fuse. The embodiment shown in FIG. 3 includes inline fuses for supplying power to the processor core. In some cases, the fuses are not able to support the amount of current that flows through the fuses to power the processor core. Thus, FIG. 4 is an embodiment using a transistor to gate current flow, and the fuse itself is used to turn on or off the transistor.

Device 400 includes multiple cores, one of which being processor core 405. Device voltage 420 provides a supply voltage to voltage offset network 410. In turn, voltage offset network 410 is configured to create an optimum offset value that results in an processor core optimum supply voltage, which is provided to processor core 405.

Voltage offset network 410 includes offset components 430-460. Each offset component includes a fuse, a transistor, and a resistor (with the exception of offset component 460). During device configuration, particular fuses are blown that, in turn, turn on or turn off their respective transistors. When an offset component's transistor is turned on, current flows through the transistor and supplies power to processor core 405.

If processor core 405 requires the maximum supply voltage available, offset components 430-450's fuses are blown, and offset component 460's fuse is kept in tact in order for device voltage 420 to pass through offset component 460 without encountering a resistor to produce a voltage drop. When processor core 405 requires less voltage than device voltage 420 supplies, offset component 460's fuse is blown and offset components 430-450's fuses are blown appropriately in order to produce the optimum offset value across their respective resistors. As a result, voltage offset network 410 provides the processor core optimum supply voltage to processor core 405.

In one embodiment, a voltage offset network may include a bank of fuses in order to provide voltage offset flexibility. In this embodiment, an initial bank of fuses is blown for the voltage offset network to provide an optimum processor core supply voltage. Later in time, an application may change, which may require the voltage offset network to provide a different optimum processor core supply voltage. As such, the voltage offset network's settings are changed by blowing a master fuse, which directs the voltage offset network to use a second fuse bank to generate a voltage offset instead of the initial fuse bank.

Figure 5:
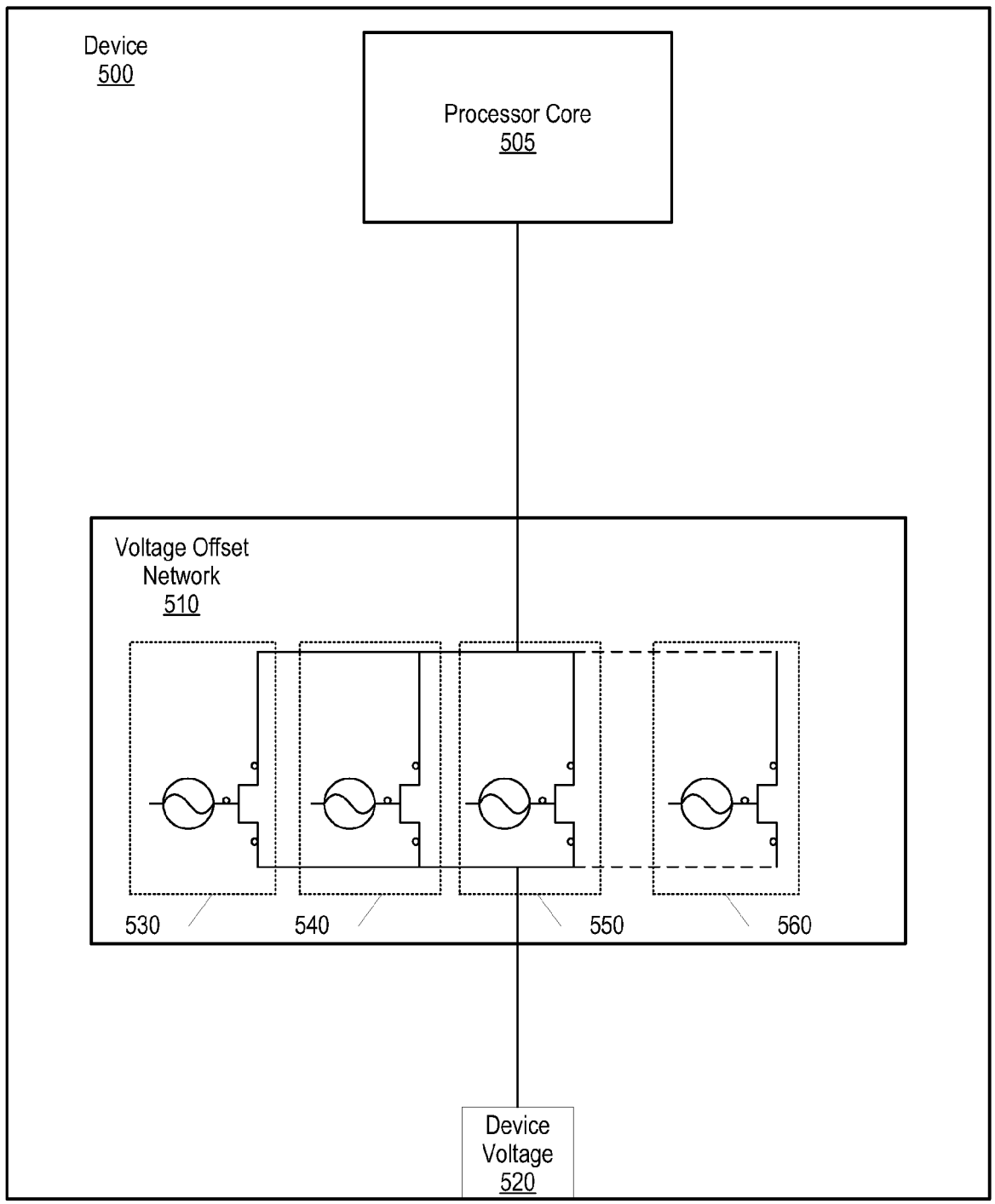
FIG. 5 is a diagram showing an embodiment of a voltage offset network that includes multiple offset components, each of which comprise a fuse and a transistor.

FIG. 5 is a diagram showing an embodiment of a voltage offset network that includes multiple offset components, each of which comprise a fuse and a transistor. The embodiment in FIG. 5 shows that offset components 530 through 560 do not include a resistor. In this embodiment, voltage offset network 510 may require more offset components than the embodiment shown in FIG. 4 in order to create a particular offset value because a transistor's resistance is less than a resistor's resistance. An advantage of the embodiment shown in FIG. 5, however, is that a transistor requires less physical space on a silicon substrate than a resistor requires. Another advantage of this embodiment is that voltage offset network 510's offset value may be more finely controlled.

Device 500 includes multiple cores, one of which being processor core 505. Device voltage 520 provides a supply voltage to voltage offset network 510. In turn, voltage offset network 510 is configured to create an optimum offset value that results in an processor core optimum supply voltage, which is provided to processor core 505.

Voltage offset network 510 includes offset components 530-560. Each offset component includes a fuse and a transistor. During device configuration, particular fuses are blown that, in turn, turn on or turn off their respective transistors. When an offset component's transistor is turned on, current flows through the transistor (producing a slight voltage offset) and supplies power to processor core 505.

Figure 6:
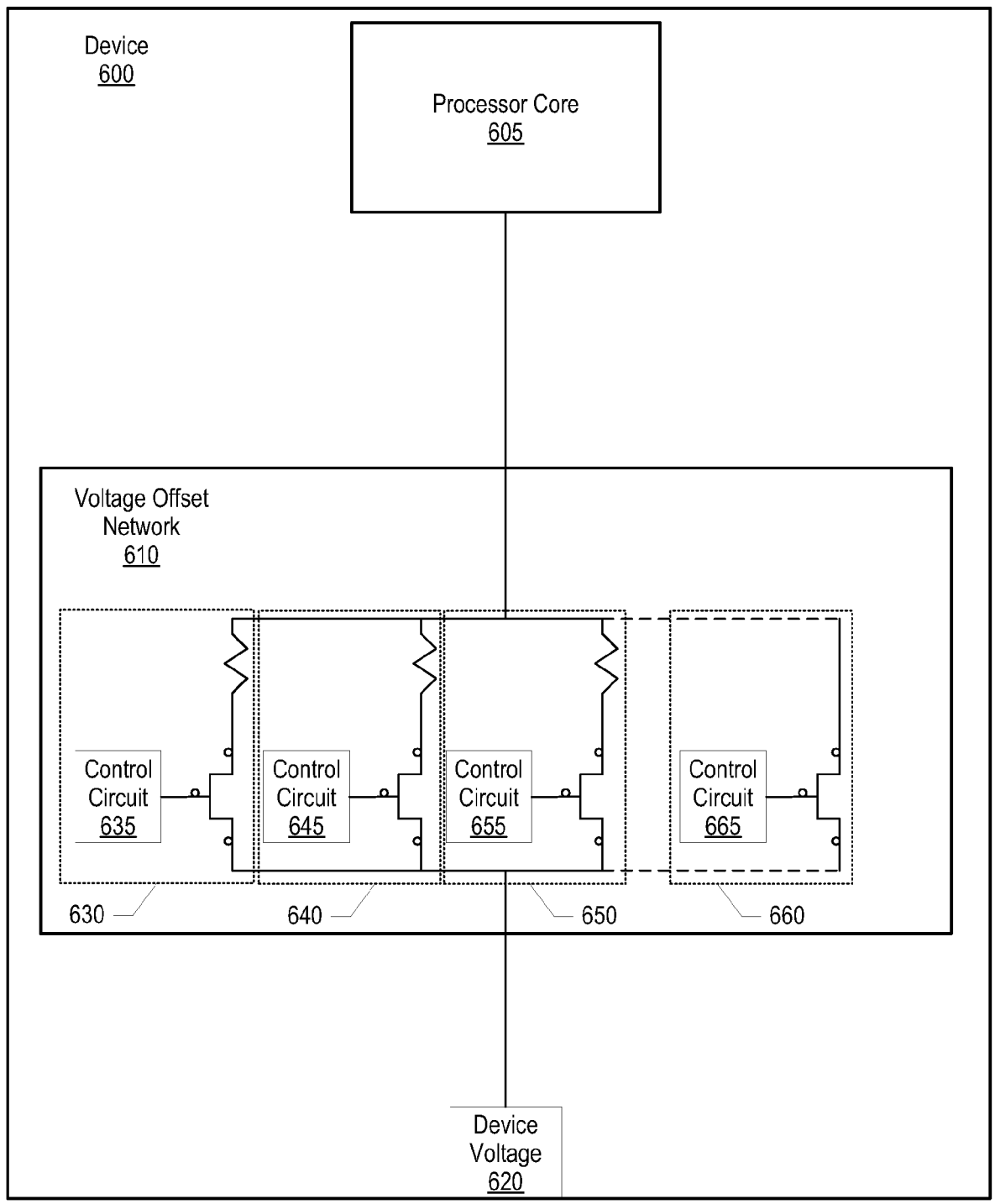
FIG. 6 is a diagram showing an embodiment of a voltage offset network that includes multiple offset components, most of which comprise a resistor, transistor, and a control circuit.

FIG. 6 is a diagram showing an embodiment of a voltage offset network that includes multiple offset components, most of which comprise a resistor, transistor, and a control circuit. The difference between the embodiment shown in FIG. 4 versus the embodiment shown in FIG. 6 is that FIG. 6's embodiment replaces fuses with a control circuit. The control circuit provides the ability for voltage offset network 610 to dynamically adjust its offset value during device operation instead of blowing fuses, which results in a fixed offset value.

Device 600 includes multiple cores, one of which being processor core 605. Device voltage 620 provides a supply voltage to voltage offset network 610. In turn, voltage offset network 510 is configured to create an optimum offset value that results in an processor core optimum supply voltage, which is provided to processor core 605.

Voltage offset network 610 includes offset components 630-660. Each offset component includes a control circuit (control circuits 635-665), a transistor, and a resistor (with the exception of offset component 660). During device configuration, particular control circuits are activated that, in turn, turn on or turn off their respective transistors. When an offset component's transistor is turned on, current flows through the transistor and supplies power to processor core 605. In one embodiment, voltage offset network 610 includes a single control circuit that controls offset components 630-660.

If processor core 605 requires the maximum supply voltage available, offset components 630-650's control circuits are deactivated, and offset component 660's control circuit is activated in order for device voltage 620 to pass through voltage offset network 660 without encountering a resistor to produce a voltage drop. When processor core 605 requires less voltage than device voltage 620 supplies, offset component 660's control circuit is deactivated and offset components 630-650's control circuits are activated appropriately in order to produce an optimum offset value across their respective resistors. As a result, voltage offset network 610 provides the processor core optimum supply voltage to processor core 605.

The embodiment shown in FIG. 6 provides device 600 with the ability to monitor device parameters and reconfigure control circuits 635-665 appropriately. For example, device 600 may monitor its device temperature and, in this example, may configure control circuits 635-665 appropriately in order to achieve optimum offset values over a temperature range. In another example, processor core 605 may require extra voltage during highly computational tasks and, in this example, device 600 may reconfigure control circuits 635-665 in order to decrease voltage offset network 610's optimum offset value, which increases processor core 605's supply voltage (see FIG. 10 and corresponding text for further details).

Figure 7:
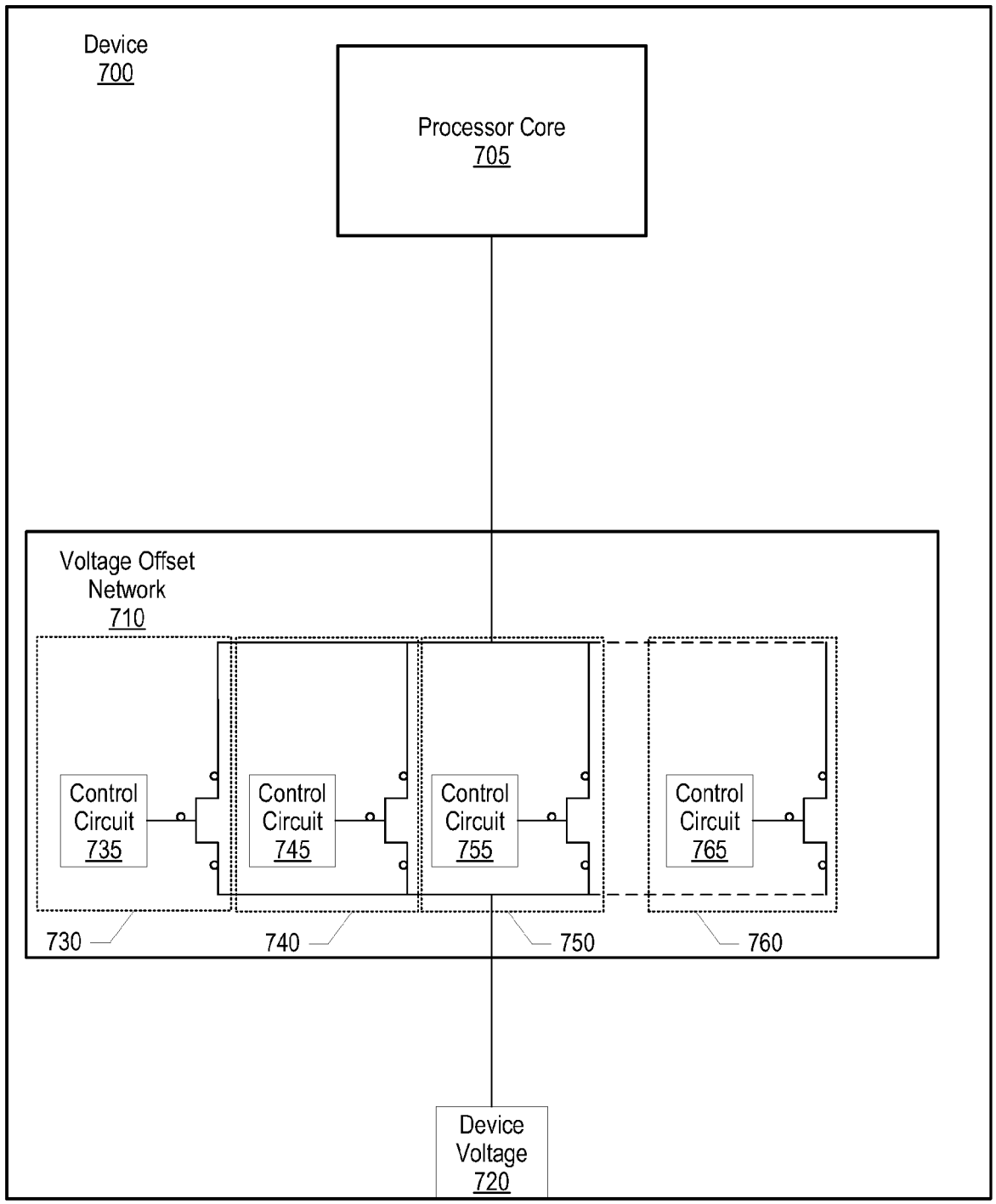
FIG. 7 is a diagram showing an embodiment of a voltage offset network that includes multiple offset components, each of which comprise a control circuit and a transistor.

FIG. 7 is a diagram showing an embodiment of a voltage offset network that includes multiple offset components, each of which comprise a control circuit and a transistor. The difference between the embodiment shown in FIG. 6 versus the embodiment shown in FIG. 7 is that the offset components shown in FIG. 7 do not include a resistor. As discussed in FIG. 5's corresponding text, an advantage of this embodiment is that a transistor requires less physical space on a silicon substrate than a resistor requires. Another advantage of this embodiment is that voltage offset network 710's offset value may be more finely controlled.

Device 700 includes multiple cores, one of which being processor core 705. Device voltage 720 provides a supply voltage to voltage offset network 710. In turn, voltage offset network 710 is configured to create an optimum offset value that results in an processor core optimum supply voltage, which is provided to processor core 705.

Voltage offset network 710 includes offset components 730-760. Each offset component includes a control circuit (control circuits 735-765) and a transistor. During device configuration, particular control circuits are activated that, in turn, turn on or turn off their respective transistors. When an offset component's transistor is turned on, current flows through the transistor and supplies power to processor core 705. In one embodiment, voltage offset network 710 includes a single control circuit that controls offset components 730-760.

Figure 10:
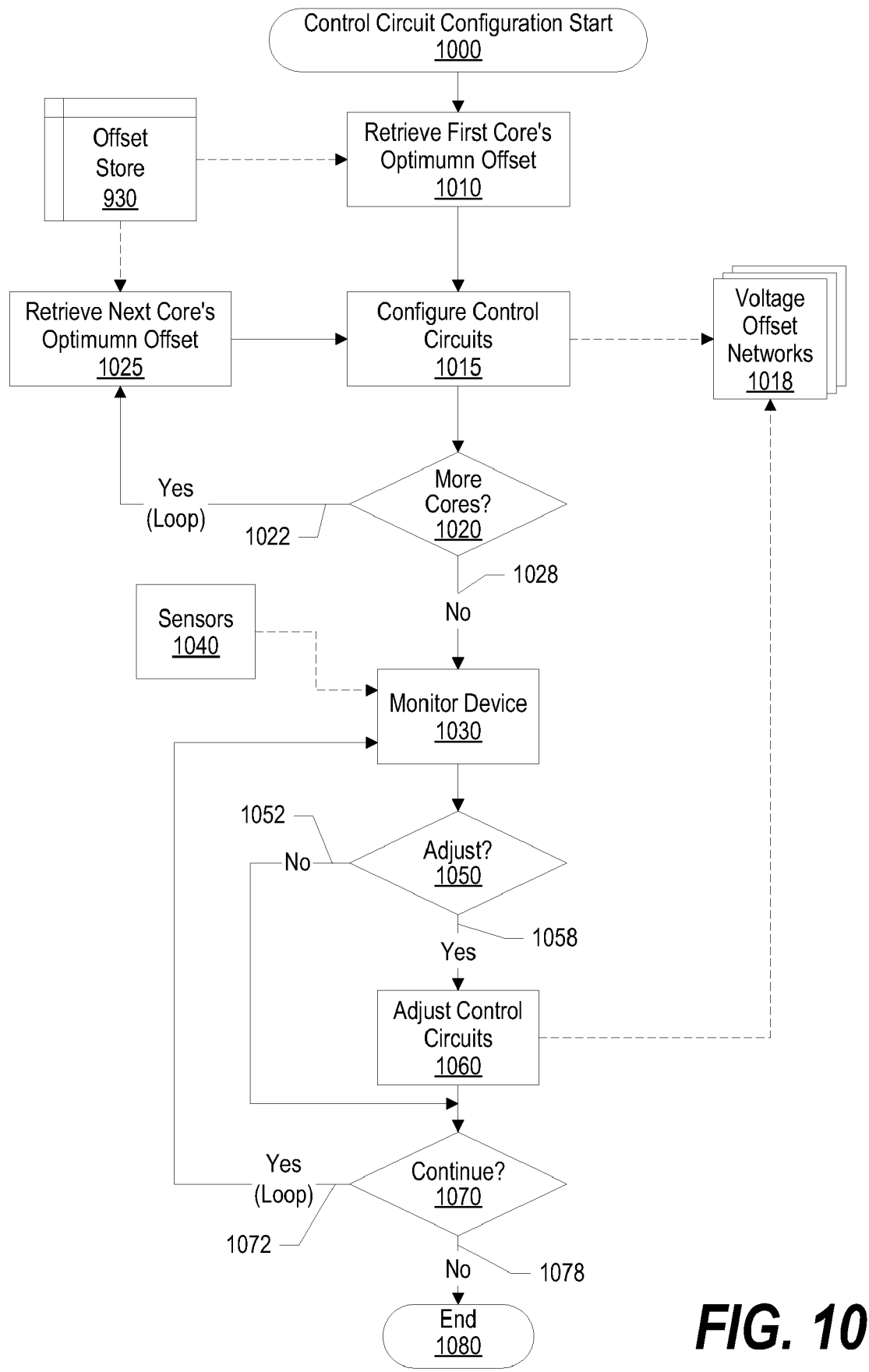
FIG. 10 is a flowchart showing steps taken in configuring control circuits to dynamically create optimum offset values that, in turn, result in processor core optimum supply voltages.

Since the embodiment shown in FIG. 7 includes control circuits instead of fuses, this embodiment provides device 700 with the ability to monitor device parameters and reconfigure control circuits appropriately (see FIG. 10 and corresponding text for further details).

Figure 8:
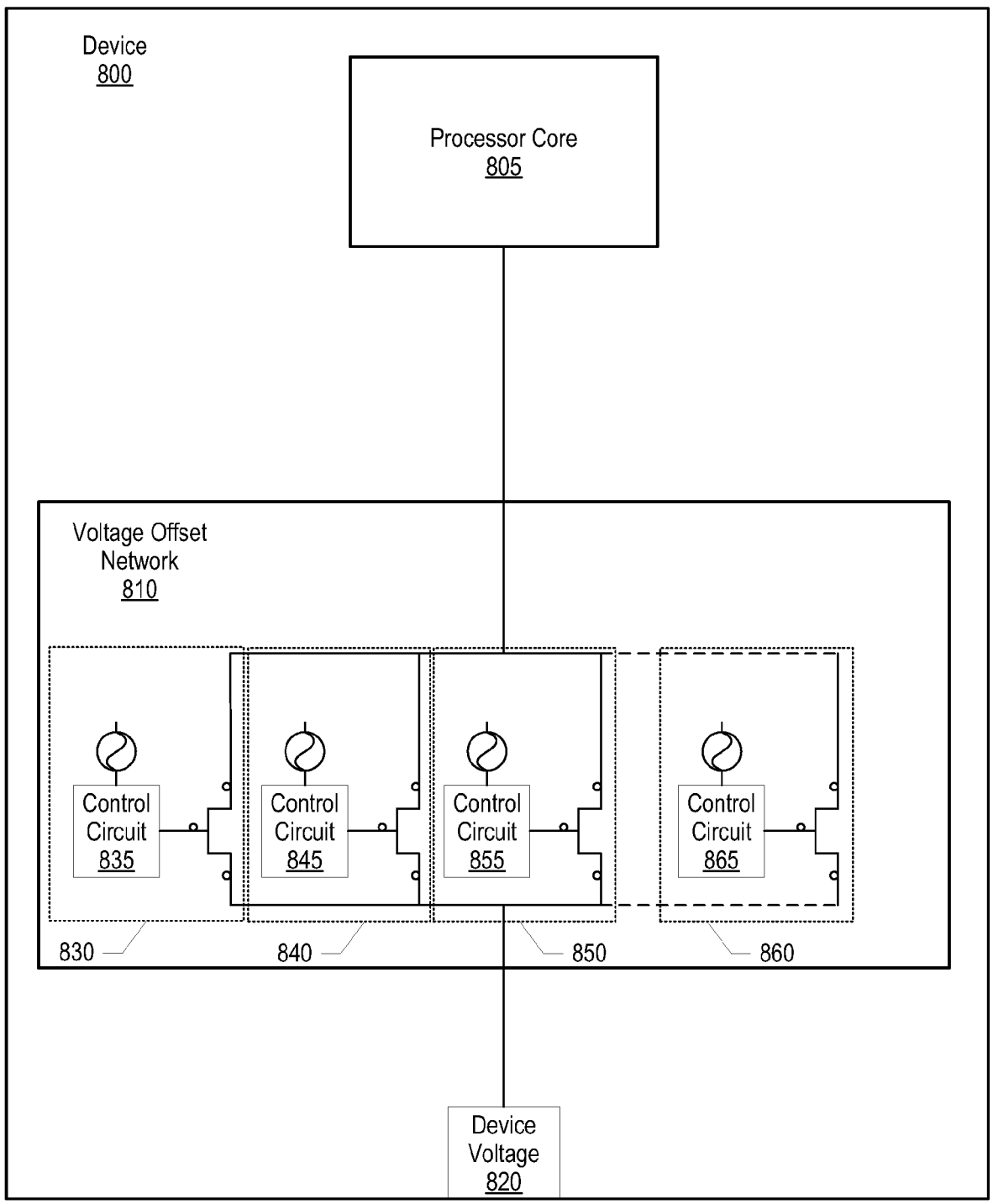
FIG. 8 is a diagram showing an embodiment of a voltage offset network that includes multiple offset components, each of which comprise a control circuit, a fuse, and a transistor.

FIG. 8 is a diagram showing an embodiment of a voltage offset network that includes multiple offset components, each of which comprise a control circuit, a fuse, and a transistor. The difference between the embodiment shown in FIG. 7 versus the embodiment shown in FIG. 8 is that the offset components include a fuse coupled to a control circuit that may be blown during module test. In this embodiment, control circuits 830-860 may use their respective fuse settings to turn on/off their respective transistor, or they may be configured to dynamically control their respective transistors as discussed in FIG. 7's corresponding text.

Device 800 includes multiple cores, one of which being processor core 805. Device voltage 820 provides a supply voltage to voltage offset network 810. In turn, voltage offset network 810 is configured to create an optimum offset value that results in an processor core optimum supply voltage, which is provided to processor core 805.

Voltage offset network 810 includes offset components 830-860. Each offset component includes a fuse, a control circuit (control circuits 835-865) and a transistor. During device test, particular fuses are blown in order for voltage offset network 810 to create an optimum offset value. During device operation, control circuits 835-865 may be configured to use their respective fuse settings to turn on/off their transistor, or control circuits 835-865 may be configured to dynamically accept input from device 800 to gate on/off their transistors (see FIG. 10 and corresponding text for further details). In one embodiment, voltage offset network 810 includes a single control circuit that controls offset components 830-860.

Figure 9A:
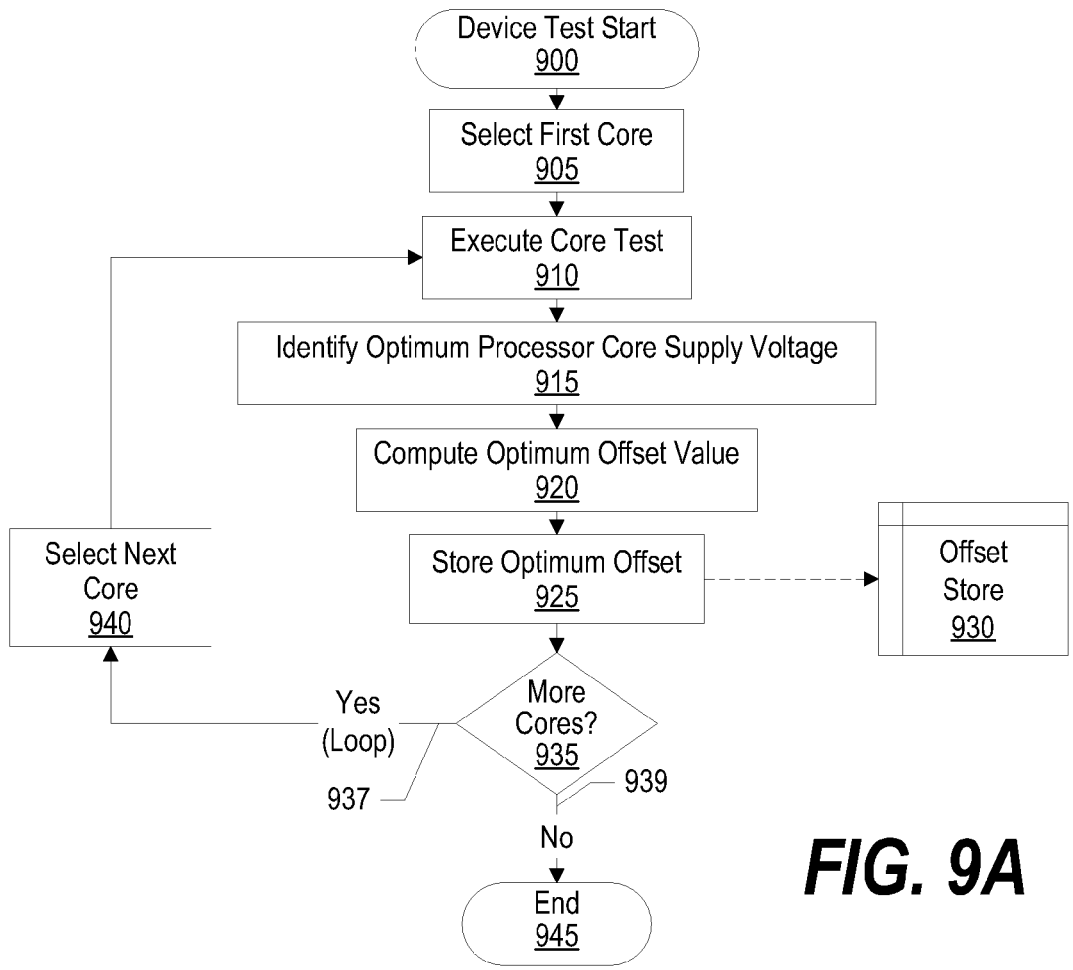
FIG. 9A is a flowchart showing steps taken in testing individual processor cores in order to identify an optimum supply voltage.

FIG. 9A is a flowchart showing steps taken in testing individual processor cores in order to identify an optimum supply voltage. A multi-core device proceeds through a series of tests in order to identify a processor core optimum supply voltage for each processor core. For example, one processor core may require 1.435 volts for optimum performance and another processor core may require 1.498 volts for optimum performance.

Device testing commences at 900, whereupon processing selects a first core included in the multi-core device at step 905. At step 910, processing executes a core test that tests the processor core at particular voltage levels. Processing then evaluates the core test results, and identifies a processor core optimum supply voltage at step 915.

Once identified, processing computes an optimum offset value for the processor core by subtracting the device supply voltage from the processor core optimum supply voltage (step 920). For example, if the device supply voltage is 2.0 volts, and the identified processor core optimum supply voltage is 1.75 volts, the computed optimum offset value is 0.25 volts. At step 925, processing stores the optimum offset value for the first processor core in offset store 930. Offset store 930 may be stored on a volatile or nonvolatile storage area, such as computer memory or a computer hard drive.

A determination is made as to whether the multi-core device includes more processor cores to test (decision 935). If the multi-core device includes more processor cores to test, decision 935 branches to "Yes" branch 937 which loops back to select (step 940) and test the next processor core. This looping continues until each of the processor cores within the multi-core device have been tested, at which point decision 935 branches to "No" branch 939 whereupon processing ends at 945.

Figure 9B:
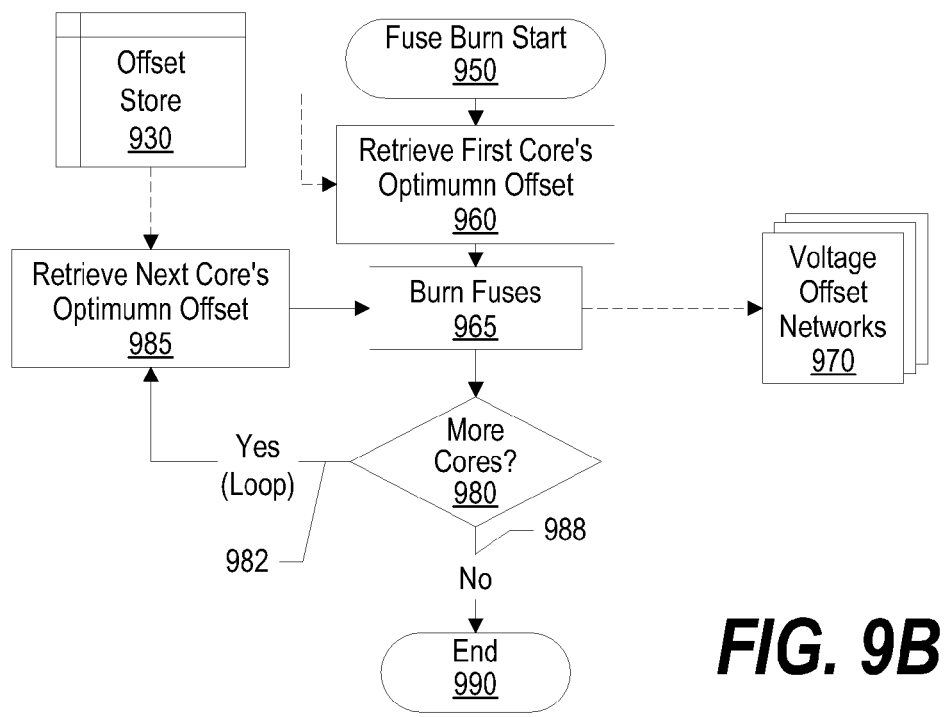
FIG. 9B is a flowchart showing steps taken in configuring voltage offset networks that include fuses for providing an optimum supply voltage to each processor core.

FIG. 9B is a flowchart showing steps taken in configuring voltage offset networks that include fuses for providing an optimum supply voltage to each processor core. Various embodiments of a voltage offset network use fuses to either include or exclude particular circuitry (e.g., resistors) in the voltage offset network in order to achieve a desired offset. For example, many offset values are possible by using resistor/fuse combinations in parallel with each other, and blowing particular fuses to exclude particular resistors from the voltage offset network. In turn, the remaining resistors create a voltage drop that results in the optimum offset value (see FIG. 3 and corresponding text for further details).

Processing commences at 950, whereupon processing retrieves an optimum offset value for a first processor core included in a multi-core device from offset store 930 at step 960. The optimum offset value was computed and stored in offset store 930 during device test (see FIG. 9A and corresponding text for further details). Offset store 930 is the same as that shown in FIG. 9A. At step 965, processing burns particular fuses in the voltage offset network (included in voltage offset networks 970) corresponding to the first processor core in order to achieve the optimum offset value.

A determination is made as to whether there are additional processor cores included in the multi-core device whose voltage offset network requires configuring (decision 980). If there are more voltage offset networks to be configured, decision 980 branches to "Yes" branch 982, which loops back to retrieve the next optimum offset value (step 985) and configure the corresponding voltage offset network included in voltage offset networks 970. This looping continues until each of the voltage offset networks has been configured, at which point decision 980 branches to "No" branch 988 whereupon processing ends at 990.

FIG. 10 is a flowchart showing steps taken in configuring control circuits to dynamically create optimum offset values that, in turn, result in processor core optimum supply voltages. Processing commences at 1000, whereupon processing retrieves an optimum offset value for a first processor core included in a multi-core device from offset store 930 at step 1010. The optimum offset value was computed and stored in offset store 930 during device test (see FIG. 9A and corresponding text for further details). Offset store 930 is the same as that shown in FIG. 9A. At step 1015, processing configures particular control circuits in the voltage offset network (included in voltage offset networks 1018) corresponding to the first processor core in order to achieve the optimum offset value.

A determination is made as to whether there are more processor cores included in the multi-core device whose voltage offset network requires configuring (decision 1020). If there are more voltage offset networks to be configured, decision 1020 branches to "Yes" branch 1022, which loops back to retrieve the next optimum offset value (step 1025) and configure the corresponding voltage offset network included in voltage offset networks 1018. This looping continues until each of the voltage offset networks have been configured, at which point decision 1020 branches to "No" branch 1028.

At step 1030, processing monitors device parameters by receiving input from sensors 1040. For example, one of sensors 1040 may be a temperature sensor and, in this example, processing monitors the device's temperature and adjusts the optimum offset value accordingly. In another example, a processor core may require extra voltage during highly computational tasks and, in this example, processing may decrease the optimum offset value in order to increase the processor core supply voltage to the processor core.

A determination is made as to whether to adjust one or more of the control circuits for the processor cores in response to monitoring the device parameters (decision 1050). If processing should adjust the optimum offset values, decision 1050 branches to "Yes" branch 1058 whereupon processing adjusts the control circuits located in voltage offset networks 1018 accordingly. On the other hand, if the control circuits do not require adjusting, decision 1050 branches to "No" branch 1052 bypassing control circuit adjustment steps.

A determination is made as to whether to continue monitoring the device (decision 1070). If processing should continue, decision 1070 branches to "Yes" branch 1072, which loops back to continue monitoring the device and adjusting the control circuits accordingly. This looping continues until processing should stop monitoring the device, at which point decision 1070 branches to "No" branch 1078 at processing ends at 1080.

Figure 11:
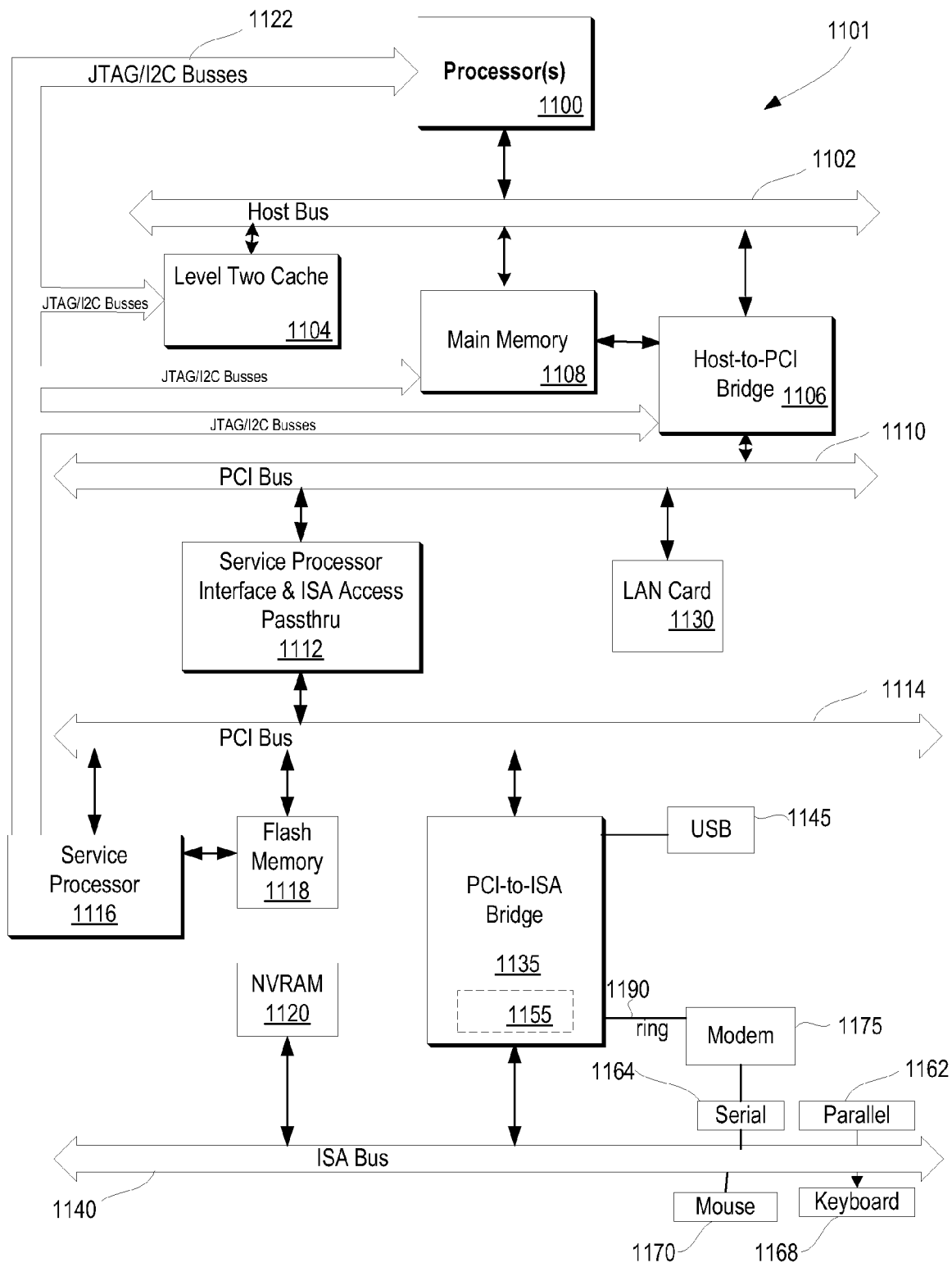
FIG. 11 is a block diagram of a computing device capable of implementing the present invention.

FIG. 11 illustrates information handling system 1101 which is a simplified example of a computer system capable of performing the computing operations described herein. Computer system 1101 includes processor 1100 which is coupled to host bus 1102. A level two (L2) cache memory 1104 is also coupled to host bus 1102. Host-to-PCI bridge 1106 is coupled to main memory 1108, includes cache memory and main memory control functions, and provides bus control to handle transfers among PCI bus 1110, processor 1100, L2 cache 1104, main memory 1108, and host bus 1102. Main memory 1108 is coupled to Host-to-PCI bridge 1106 as well as host bus 1102. Devices used solely by host processor(s) 1100, such as LAN card 1130, are coupled to PCI bus 1110. Service Processor Interface and ISA Access Pass-through 1112 provides an interface between PCI bus 1110 and PCI bus 1114. In this manner, PCI bus 1114 is insulated from PCI bus 1110. Devices, such as flash memory 1118, are coupled to PCI bus 1114. In one implementation, flash memory 1118 includes BIOS code that incorporates the necessary processor executable code for a variety of low-level system functions and system boot functions.

PCI bus 1114 provides an interface for a variety of devices that are shared by host processor(s) 1100 and Service Processor 1116 including, for example, flash memory 1118. PCI-to-ISA bridge 1135 provides bus control to handle transfers between PCI bus 1114 and ISA bus 1140, universal serial bus (USB) functionality 1145, power management functionality 1155, and can include other functional elements not shown, such as a real-time clock (RTC), DMA control, interrupt support, and system management bus support. Nonvolatile RAM 1120 is attached to ISA Bus 1140. Service Processor 1116 includes JTAG and I2C busses 1122 for communication with processor(s) 1100 during initialization steps. JTAG/I2C busses 1122 are also coupled to L2 cache 1104, Host-to-PCI bridge 1106, and main memory 1108 providing a communications path between the processor, the Service Processor, the L2 cache, the Host-to-PCI bridge, and the main memory. Service Processor 1116 also has access to system power resources for powering down information handling device 1101.

Peripheral devices and input/output (I/O) devices can be attached to various interfaces (e.g., parallel interface 1162, serial interface 1164, keyboard interface 1168, and mouse interface 1170 coupled to ISA bus 1140. Alternatively, many I/O devices can be accommodated by a super I/O controller (not shown) attached to ISA bus 1140.

In order to attach computer system 1101 to another computer system to copy files over a network, LAN card 1130 is coupled to PCI bus 1110. Similarly, to connect computer system 1101 to an ISP to connect to the Internet using a telephone line connection, modem 11115 is connected to serial port 1164 and PCI-to-ISA Bridge 1135.

While FIG. 11 shows one information handling system that employs processor(s) 1100, the information handling system may take many forms. For example, information handling system 1101 may take the form of a desktop, server, portable, laptop, notebook, or other form factor computer or data processing system. Information handling system 1101 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An apparatus comprising:
   a device that receives a device supply voltage, the device including:
   a plurality of processor cores;
   a plurality of voltage offset networks, wherein each of the plurality of voltage offset networks receive the device supply voltage and generate a processor core supply voltage, the generation resulting in a plurality of processor core supply voltages that are supplied to the plurality of processor cores; and
   a fuse included in at least one of the voltage offset networks, the fuse providing a fuse setting that specifies whether an offset component included in the at least one of the voltage offset networks contributes to the generation of one of the plurality of processor core supply voltages; and
   a control circuit that is configured to use the fuse setting or one or more device parameters from the device for determining whether to have the offset component contribute to the generation of one of the plurality of processor core supply voltages.

2. The apparatus of claim 1 wherein at least two of the plurality of processor core supply voltages are different voltage levels.

3. The apparatus of claim 1 wherein each of the plurality of processor cores receives a single processor core supply voltage from the plurality of processor core supply voltages.

4. The apparatus of claim 1 wherein at least one of the plurality of voltage offset networks further comprises:
   a resistor; and
   wherein the fuse controls whether the resistor contributes to the generation of one of the plurality of processor core supply voltages.

5. The apparatus of claim 1 wherein at least one of the plurality of voltage offset networks further comprises:
   a transistor; and
   wherein the fuse controls whether the transistor contributes to the generation of one of the plurality of processor core supply voltages.

6. The apparatus of claim 5 further comprising:
   a resistor coupled to the transistor; and
   wherein the fuse controls whether the resistor contributes to the generation of one of the plurality of processor core supply voltages.

7. The apparatus of claim 1 wherein at least one of the plurality of voltage offset networks further comprises:
   a transistor; and
   the control circuit for determining whether the transistor contributes to the generation of one of the plurality of processor core supply voltages.

8. The apparatus of claim 7 further comprising:
   wherein the control circuit receives the one or more device parameters and is adapted to adjust one of the plurality of processor core supply voltages based upon the one or more device parameters.

9. The apparatus of claim 7 further comprising:
   a resistor coupled to the transistor; and
   wherein the control circuit determines whether the resistor contributes to the generation of one of the plurality of processor core supply voltages.

10. The apparatus of claim 7 further comprising:
    wherein the fuse controls whether the transistor contributes to the generation of one of the plurality of processor core supply voltages.

11. The apparatus of claim 1 wherein the device includes one voltage plane.

12. The apparatus of claim 1 wherein the plurality of processor cores are heterogeneous.

13. A computer-implemented method comprising:
    receiving, within a device, a device supply voltage;
    generating, within the device, a plurality of processor core supply voltages, wherein at least two of the plurality of processor core supply voltages are different voltage levels, the generation including burning one or more fuses within the device, the one or more fuses providing a fuse setting that specifies whether an offset component included in the device contributes to the generation of one of the plurality of processor core supply voltages;
    configuring a control circuit to use the fuse setting or one or more device parameters from the device for determining whether to have the offset component contribute to the generation of one of the plurality of processor core supply voltages; and
    providing, within the device, the plurality of processor core supply voltages to a plurality of processor cores.

14. The method of claim 13 further comprising:
    selecting a first processor core from the plurality of processor cores;
    testing the first processor core, which results in an optimum offset value; and
    storing the optimum offset value for the first processor core.

15. The method of claim 14 further comprising:
    retrieving the optimum offset value;
    burning the one or more fuses based upon the optimum offset value, the burning resulting in a first processor core supply voltage that is included in the plurality of processor core supply voltages; and
    providing the first processor core supply voltage to the first processor core.

16. The method of claim 15 wherein the one or more fuses controls the operation of one or more transistors that contribute to the first processor core supply voltage.

17. The method of claim 14 further comprising:
    retrieving the optimum offset value; and
    configuring the control circuit based upon the optimum offset value, the configuring resulting in a first processor core supply voltage that is included in the plurality of processor core supply voltages; and
    providing the first processor core supply voltage to the first processor core.

18. The method of claim 17 further comprising:
receiving the one or more device parameters during the device's operation; and
dynamically adjusting the first processor core supply voltage based upon the one or more device parameters.

19. The method of claim 18 wherein at least one of the device parameters is selected from the group consisting of a temperature value and a performance value.

20. The method of claim 17 wherein the control circuit controls the operation of one or more transistors that contributes to the first processor core supply voltage.

21. A computer-implemented method comprising:
receiving, within a device, a device supply voltage;
generating, within the device, a plurality of circuitry supply voltages, wherein at least two of the plurality of circuitry supply voltages are different voltage levels, the generation including burning one or more fuses within the device, the one or more fuses providing a fuse setting that specifies whether an offset component included in the device contributes to the generation of one or more of the plurality of circuitry supply voltages;
configuring a control circuit to use the fuse setting or one or more device parameters from the device for determining whether to have the offset component contribute to the generation of one of the plurality of processor core supply voltages; and
providing, within the device, the plurality of circuitry supply voltages to a plurality of circuitry modules.

22. The method of claim 21 further comprising:
selecting a first circuitry module from the plurality of circuitry modules;
testing the first circuitry module, which results in an optimum offset value; and
storing the optimum offset value for the first circuitry module.

23. The method of claim 22 further comprising:
retrieving the optimum offset value;
burning the one or more fuses based upon the optimum offset value, the burning resulting in a first circuitry supply voltage that is included in the plurality of circuitry supply voltages; and
providing the first circuitry supply voltage to the first circuitry module.

24. The method of claim 22 further comprising:
retrieving the optimum offset value; and
configuring the control circuit based upon the optimum offset value, the configuring resulting in a first circuitry supply voltage that is included in the plurality of circuitry supply voltages; and
providing the first circuitry supply voltage to the first circuitry module.

25. The method of claim 24 further comprising:
receiving the one or more device parameters during the device's operation; and
dynamically adjusting the first circuitry supply voltage based upon the one or more device parameters.

26. The method of claim 25 wherein at least one of the device parameters is selected from the group consisting of a temperature value and a performance value.

27. An apparatus comprising:
a device that receives an external device supply voltage, the device including:
a plurality of circuitry modules;
a plurality of voltage offset networks, wherein each of the plurality of voltage offset networks receive the device supply voltage and generate a circuitry supply voltage, the generation resulting in a plurality of circuitry supply voltages that are supplied to the plurality of circuitry modules; and
a control circuit included in at least one of the voltage offset networks, the control circuit configured to use a fuse setting or one or more device parameters from the device for determining whether to have an offset component included in the at least one of the voltage offset networks contribute to the generation of one of the plurality of processor core supply voltages.

28. The apparatus of claim 27 wherein at least two of the plurality of circuitry supply voltages are different voltage levels.

29. The apparatus of claim 27 wherein at least one of the plurality of voltage offset networks further comprises:
a transistor; and
wherein the control circuit determines whether the transistor contributes to the generation of one or more of the plurality of circuitry supply voltages.

30. The apparatus of claim 29 further comprising:
wherein the control circuit receives the one or more device parameters and is adapted to adjust one or more of the plurality of circuitry supply voltages based upon the one or more device parameters; and
wherein at least one of the device parameters is selected from the group consisting of a temperature value and a performance value.

* * * * *